United States Patent
Haga

(10) Patent No.: US 11,560,489 B2
(45) Date of Patent: Jan. 24, 2023

(54) DISPERSION LIQUID OF COLORED RESIN FINE PARTICLES FOR AQUEOUS INK, AND AQUEOUS INK COMPOSITION FOR WRITING INSTRUMENTS USING SAME

(71) Applicant: MITSUBISHI PENCIL COMPANY, LIMITED, Tokyo (JP)

(72) Inventor: Hisato Haga, Tokyo (JP)

(73) Assignee: MITSUBISHI PENCIL COMPANY, LIMITED, Tokyo (JP)

(*) Notice: Subject to any disclaimer, the term of this patent is extended or adjusted under 35 U.S.C. 154(b) by 304 days.

(21) Appl. No.: 16/957,599

(22) PCT Filed: Dec. 21, 2018

(86) PCT No.: PCT/JP2018/047205
§ 371 (c)(1),
(2) Date: Jun. 24, 2020

(87) PCT Pub. No.: WO2019/131491
PCT Pub. Date: Jul. 4, 2019

(65) Prior Publication Data
US 2020/0347251 A1 Nov. 5, 2020

(30) Foreign Application Priority Data
Dec. 25, 2017 (JP) .............................. JP2017-248117

(51) Int. Cl.
| C09D 11/107 | (2014.01) |
| C09D 11/033 | (2014.01) |
| C09D 11/17 | (2014.01) |
| B43K 7/02 | (2006.01) |
| B43K 8/02 | (2006.01) |

(52) U.S. Cl.
CPC .......... C09D 11/107 (2013.01); C09D 11/033 (2013.01); C09D 11/17 (2013.01); B43K 7/02 (2013.01); B43K 8/022 (2013.01)

(58) Field of Classification Search
CPC ........ C09D 11/17; C09D 11/18; C09D 11/107
See application file for complete search history.

(56) References Cited

U.S. PATENT DOCUMENTS

| 2004/0132863 A1* | 7/2004 | Narita .................... C09D 11/30 523/160 |
| 2018/0079920 A1 | 3/2018 | Haga et al. |
| 2021/0316566 A1 | 10/2021 | Kamitani |

FOREIGN PATENT DOCUMENTS

| JP | H10259337 A | | 9/1998 |
| JP | H1135868 A | | 2/1999 |
| JP | 2004203996 A | | 7/2004 |
| JP | 2013199605 A | | 10/2013 |
| JP | 2015168808 A | | 9/2015 |
| JP | 2016196623 A | | 11/2016 |
| JP | 2017171909 A | | 9/2017 |
| JP | 2020-23118 | * | 2/2020 |
| JP | 2020-59213 | * | 4/2020 |
| JP | 2022012779 | * | 1/2022 |
| JP | 2022043715 | * | 3/2022 |
| TW | 1751212 | * | 1/2022 |
| WO | 2016/163291 A1 | | 10/2016 |
| WO | 2020/032104 A1 | | 2/2020 |

OTHER PUBLICATIONS

International Search Report (PCT/ISA/210) dated Feb. 12, 2019, by the Japan Patent Office as the International Searching Authority for International Application No. PCT/JP2018/047205.
Written Opinion (PCT/ISA/237) dated Feb. 12, 2019, by the Japan Patent Office as the International Searching Authority for International Application No. PCT/JP2018/047205.
Extended European Search Report dated Aug. 26, 2021, issued by the European Patent Office in corresponding European Application No. 18896692.3-1102. (6 pages).

* cited by examiner

Primary Examiner — J C Jacyna
(74) Attorney, Agent, or Firm — Buchanan, Ingersoll & Rooney PC

(57) ABSTRACT

Provided is a dispersion liquid of colored resin fine particles for an aqueous ink having excellent stability and a sufficient drawn line intensity; an aqueous ink composition for a writing instrument such as felt-tip pens, marking pens, and ballpoint pens using the dispersion liquid of the colored resin fine particle as a colorant; and a writing instrument loaded with the composition. The dispersion liquid of colored resin fine particles for an aqueous ink includes colored resin fine particles dispersed in water, the colored resin fine particles composed of at least a cyclohexyl (meth)acrylate monomer, and a basic dye or an oil-soluble dye, in which the content of the cyclohexyl (meth)acrylate monomer is 30% by mass or more, and the content of the basic dye or the oil-soluble dye is 15% by mass or more based on the total polymer component constituting the colored resin fine particles.

13 Claims, No Drawings

DISPERSION LIQUID OF COLORED RESIN FINE PARTICLES FOR AQUEOUS INK, AND AQUEOUS INK COMPOSITION FOR WRITING INSTRUMENTS USING SAME

TECHNICAL FIELD

The present invention relates to a dispersion liquid of colored resin fine particles for an aqueous ink, and an aqueous ink composition for a writing instrument that is prepared by using the dispersion liquid and that is suitable for writing instruments such as felt-tip pens, marking pens, and ballpoint pens.

BACKGROUND ART

It has so far been known that resin emulsions having a specific polymer configuration colored with a dye are used as a colorant called a pseudo pigment.

Known are, for example, 1) an aqueous dispersion liquid of colored resin fine particles for an aqueous ink prepared by dissolving a water-soluble basic dye in a vinyl monomer having an acidic functional group in the presence of a polymerizable surfactant and emulsion-polymerizing the vinyl monomer (see, for example, Patent Document 1), and 2) an aqueous ink composition for a writing instrument prepared by using a dispersion liquid of colored resin fine particles for an aqueous ink in which colored resin fine particles including at least a vinyl monomer (A) containing an acidic functional group of a carboxyl group having solubility of 10% by mass or less in water, an ester monomer (B) of acrylic acid or methacrylic acid with linear or cyclic alcohol having from 2 to 18 carbons, and a basic dye or an oil-soluble dye are dispersed in water (see, for example, Patent Document 2).

However, in the case of an aqueous ink for a writing instrument prepared by using the dispersion liquid of colored resin fine particles for an aqueous ink as a colorant disclosed in Patent Documents 1 and 2 described above the amount of the dye that can be included inside the colored resin fine particles has been limited. As a result, the intensity of drawn lines has tended to be slightly insufficient. On the other hand, when the amount of the dye added during synthesis of the colored resin fine particles has increased, the polymerization might be inhibited and stable colored resin fine particles could not be obtained in some cases.

CONVENTIONAL ART DOCUMENTS

Patent Document

Patent Document 1: Japanese Patent Application Laid-Open No. Hei. 10-259337 (Claims, Examples, and others)
Patent Document 2: Japanese Patent Application Laid-Open No. 2016-196623 (Claims, Examples, and others)

SUMMARY OF THE INVENTION

Problems to be Solved by the Invention

In light of the problems and the like of the known art described above, the present invention attempts to solve the problems, and an object of the present invention is to provide a dispersion liquid of colored resin fine particles for an aqueous ink having excellent stability and a sufficient drawn line intensity even when the amount of dye that can be included inside the colored resin fine particles for aqueous ink is increased; and to provide an aqueous ink composition for a writing instrument that is prepared by using the colored resin fine particles as a colorant and that is suitable for writing instruments such as felt-tip pens, marking pens, and ballpoint pens, and a writing instrument loaded with the composition.

Means to Solve the Problems

In light of the known problems described above, intense researches repeated by the present inventors have resulted in finding that a dispersion liquid of colored resin fine particles for an aqueous ink that meets the object described above, the colored resin fine particles including at least a specific monomer, and a basic dye or an oil-soluble dye, in which the content of the specific monomer and the content of the dye are set to a specific value or more; an aqueous ink composition for a writing instrument prepared by using the dispersion liquid; and a writing instrument are obtained, and the present invention has been accomplished thereby.

That is, the dispersion liquid of colored resin fine particles for an aqueous ink according to the present invention includes colored resin fine particles dispersed in water, the colored resin fine particles composed of at least a cyclohexyl (meth)acrylate monomer, and a basic dye or an oil-soluble dye, in which a content of the cyclohexyl (meth)acrylate monomer is 30% by mass or more based on a total polymer component constituting the colored resin fine particles, and a content of the basic dye or the oil-soluble dye is 15% by mass or more based on the total polymer component.

The content of the cyclohexyl (meth)acrylate monomer is preferably from 30% by mass to 95% by mass based on the total polymer component constituting the colored resin fine particles.

The colored resin fine particles preferably have an average particle size from 20 to 300 nm.

An aqueous ink composition for a writing instrument according to the present invention contain a dispersion liquid of colored resin fine particles for an aqueous ink having the configuration described above, a water-soluble organic solvent, and water.

A writing instrument according to the present invention is loaded with the aqueous ink composition for a writing instrument described above.

Effects of the Invention

According to the present invention, there is provided a dispersion liquid of colored resin fine particles for an aqueous ink which has excellent stability and a sufficient drawn line intensity even when the amount of the dye that can be included inside the colored resin fine particles for the aqueous ink is increased, and an aqueous ink composition for a writing instrument that is prepared by using the dispersion liquid as a colorant and that is suitable for writing instruments such as felt-tip pens, marking pens, and ballpoint pens, and a writing instrument loaded with the composition.

DESCRIPTION OF EMBODIMENTS

An embodiment of the present invention is described for each invention below in detail.

The dispersion liquid of colored resin fine particles for an aqueous ink according to the present invention includes colored resin composed of at least a cyclohexyl (meth) acrylate monomer, and a basic dye or an oil-soluble dye, in which the content of the cyclohexyl (meth)acrylate monomer is 30% by mass or more based on the total polymer component constituting the colored resin fine particles, and the content of the basic dye or the oil-soluble dye is 15% by mass or more based on the total polymer component.

The cyclohexyl (meth)acrylate monomer used in the present invention is used in terms of making it possible to obtain stable colored resin fine particles which are intense in color and excellent in color developability, and of allowing the obtained colored resin fine particles to have a sufficient drawn line intensity as a colorant for writing instruments, even when the amount of the dye that can be included inside is increased. Use of any other (meth)acrylate compounds such as n-butyl (meth)acrylate cannot exhibit the effect of the present invention.

Note that the "(meth)acrylate" described above refers to "acrylate and/or methacrylate". In addition, the method of producing a cyclohexyl (meth)acrylate monomer is known, and a cyclohexyl (meth)acrylate can be produced by the known method, for example, a method of esterifying (meth) acrylic acid and cyclohexanol by using a catalyst such as an inorganic acid, an organic sulfonic acid, or a strongly acidic ion exchange resin, or an ester exchange method using an organometallic compound containing titanium, tin, or the like as a catalyst.

In the present invention, in addition to the cyclohexyl (meth)acrylate monomer described above, a hydrophobic vinyl monomer other than the cyclohexyl (meth)acrylate monomer, and an aqueous monomer can be preferably used in terms of obtaining colored resin fine particles having excellent color developability.

As the hydrophobic vinyl monomer, for example, at least one of monomers such as esters of acrylic acid or methacrylic acid other than the cyclohexyl (meth)acrylate monomer, styrenes such as styrene and methyl styrene can be used.

The hydrophobic vinyl monomer that can be used includes, for example, at least one (each alone or a mixture of two or more) of methyl (meth)acrylate, ethyl (meth) acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, palmityl (meth)acrylate, stearyl (meth)acrylate, behenyl (meth)acrylate, styrene, and methyl styrene.

The aqueous monomer that can be used includes, for example, at least one (each alone or a mixture of two or more) of glycerin monomethacrylate, sodium 2-sulfoethyl methacrylate, polyethylene glycol monomethacrylate, polypropylene glycol monomethacrylate, polyethylene glycol-polypropylene glycol monomethacrylate, polyethylene glycol-tetramethylene glycol-monomethacrylate, and propylene glycol-polybutylene glycol-monomethacrylate.

The basic dye used in the present invention includes, for example, at least one of basic dyes such as di- and triarylmethane dyes; quinoneimine dyes such as azine dyes (including nigrosine), oxazine dyes, and thiazine dyes; xanthene dyes; triazoleazo dyes; triazoleazo dyes; benzothiazoleazo dyes; azo dyes; methine dyes such as polymethine dyes, azomethine dyes, and azamethine dyes; anthraquinone dyes; and phthalocyanine dyes. Preferably, the water-soluble basic dyes are desired.

The specific basic dyes that can be used include color dyes with numbers described in COLOR INDEX such as C. I. Basic Yellow (−1, −2, −9, −80, etc.), C. I. Basic Orange (−1, −2, −7, −34, etc.), C. I. Basic Red (−1, −2, −3, −53, etc.), C. I. Basic Violet (−1, −2, −3, −39, etc.), C. I. Basic Blue (−1, −2, −5, −88, etc.), C. I. Basic Green (−1, −4, −6, −10, etc.), C. I. Basic Brown (−1, −2, −4, −15, etc.), and C. I. Basic Black (−1, −2, −7, −8, etc.).

Further, commercially available products thereof can also be used, including AIZEN CATHILON YELLOW GLH (trade name manufactured by Hodogaya Chemical Co., Ltd.), and the like as yellow basic dyes; AIZEN CATHILON RED BLH, AIZEN CATHILON RED RH, and the like (all above are trade names manufactured by Hodogaya Chemical Co., Ltd.), Diacryl Supra Brilliant Red 2G and the like (trade name manufactured by Mitsubishi Chemical Corporation), Sumiacryl Red B (trade name manufactured by Sumitomo Chemical Co., Ltd.), and the like as red basic dyes; AIZEN CATHILON TURQUOISE BLUE LH (trade name manufactured by Hodogaya Chemical Co., Ltd.), and the like as blue basic dyes; Diacryl Supra Brilliant Green 2GL (trade name manufactured by Mitsubishi Chemical Corporation), and the like as green basic dyes; and Janus Brown R (trade name manufactured by Nippon Chemical Industrial Co., Ltd.), AIZEN CATHILON BROWN GH (trade name manufactured by Hodogaya Chemical Co., Ltd.), and the like as brown basic dyes.

Further, the oil-soluble dye used in the present invention includes commercially available monoazo, disazo, metal complex salt type monoazo, anthraquinone, phthalocyanine, and triarylmethane. Also, halochromic oil-soluble dyes obtained by substituting functional groups of acid and basic dyes with hydrophobic groups can be used as well.

The yellow oil-soluble dye includes C. I. Solvent Yellow 114 and 116; the orange oil-soluble dye includes C. I. Solvent Orange 67; the red oil-soluble dye includes C. I. Solvent Red 122 and 146; the blue oil-soluble dye includes C. I. Solvent Blue 5, 36, 44, 63, 70, 83, 105, and 111; and the black oil-soluble dye includes C. I. Solvent Black 3, 7, 27, and 29.

Specific commercially available oil-soluble dyes include Blue Dye SBN Blue 701 (manufactured by Hodogaya Chemical Co., Ltd.), Blue Dye Oil Blue 650 (manufactured by Orient Chemical Industries Co., Ltd.), Blue Dye Savinyl Blue GLS (manufactured by Clariant K. K.), Red Dye SOC-1-0100 (manufactured by Orient Chemical Industries Co., Ltd.), OIL BLACK 860, OIL PINK 314, OIL YELLOW 3G, VALIFAST PINK 2310 N, VALIFAST RED 3312, VALIFAST YELLOW CGHN new, VALIFAST YELLOW 1108, and VALIFAST BLACK 3830 (manufactured by Orient Chemical Industries Co., Ltd.).

In the dispersion liquid of colored resin fine particles for an aqueous ink according to the present invention, the colored resin fine particles composed of at least a cyclohexyl (meth)acrylate monomer, and a basic dye or an oil-soluble dye are dispersed in water. The dispersion liquid of colored resin fine particles can be produced by a production method, for example, by dissolving the basic dye or the oil-soluble dye described above in the cyclohexyl (meth)acrylate monomer described above or in a mixed monomer containing the cyclohexyl (meth)acrylate monomer described above and other hydrophobic vinyl monomers, and emulsion-polymerizing the monomer with a polymerization initiator such as ammonium persulfate, potassium persulfate, or hydrogen peroxide, and a polymerization initiator obtained by using a reducing agent in combination therewith, and further using a crosslinking agent such as triallyl isocyanurate, isocyanuric acid triallyl, polyethylene glycol dimethacrylate, polypropylene glycol dimethacrylate, pentaerythritol acrylate, ditrimethylolpropane acrylate, dipentaerythritol acrylate, methoxylated bisphenol A methacrylate, pentaerythritol methacrylate, ditrimethylolpropane methacrylate, dipentaerythritol methacrylate, or ethoxylated polyglycerin methacrylate, and if necessary, a polymerizable surfactant (emulsifier) such as ammonium polyoxyethylene-1-(allyloxymethyl)-alkyl ether sulfate, ether sulfate, ammonium polyoxyethylene nonylpropenylphenyl ether sulfate, polyoxyethylene nonylpropenylphenyl ether, ammonium polyacrylate, ammonium styrene-maleic acid copolymer, polyoxyethylene alkyl ether, polyoxyethylene styrenated phenyl ether, polyoxyethylene polyoxypropylene glycol, polyoxyalkylene decyl ether, polyoxyethylene tridecyl ether, alkyl benzene sulfonate, dioctyl sulfosuccinate, sodium lauryl sulfate, polyoxyethylene alkyl ether phosphate ester, polyoxyethylene styrenated phenyl ether phosphate ester, polyoxyethylene styrenated phenyl ether sulfate, and polyoxyethylene alkyl ether sulfate. The above-mentioned dyeing is carried out simultaneously with the polymerization, but the dyeing may be carried out by dissolving the basic dye or the oil-soluble dye after the polymerization.

When the above-mentioned crosslinking agent such as triallyl isocyanurate is used, heat resistance, mechanical properties, hydrolysis resistance, and weather resistance of the colored resin fine particles can be improved, which is preferable.

In the emulsion polymerization described above carried out in the present invention, a dicyclopenta(te)nyl (meth)acrylate monomer or the like may be further mixed with the above-mentioned cyclohexyl (meth)acrylate monomer or the like in an appropriate amount to carry out emulsion polymerization. With the polymer obtained by further mixing the dicyclopenta(te)nyl (meth)acrylate monomer followed by the emulsion polymerization, even if a moisture in the dispersion liquid is volatilized, the stability is less likely to be impaired, and a dispersion liquid of colored resin fine particles for an aqueous ink having more excellent stability can be obtained.

The dicyclopenta(te)nyl (meth)acrylate monomer that can be used includes dicyclopentanyl acrylate monomer, dicyclopentenyl acrylate, dicyclopentanyl methacrylate monomer, and dicyclopentenyl methacrylate.

Further, in the emulsion polymerization described above carried out in the present invention, in addition to the cyclohexyl (meth)acrylate monomer and other hydrophobic vinyl monomers descried above, and the dicyclopenta(te)nyl (meth)acrylate monomer, monomers having a reactive crosslinking group such as an epoxy group, a hydroxymethylamide group, and an isocyanate group, or a polyfunctional monomer having two or more vinyl groups may be blended in an appropriate amount for crosslinking.

In the present invention, in the polymer components constituting the colored resin fine particles for an aqueous ink, the cyclohexyl (meth)acrylate monomer described above needs to be contained in an amount of 30% by mass or more based on the total polymer component constituting the colored resin fine particles, and is desired to be contained in an amount preferably from 30 to 95% by mass, and more preferably from 30 to 70% by mass.

Note that in the present invention, the term "total polymer component" refers to a polymerizable component constituting the colored resin fine particles, and specifically, the term refers to the total amount of the cyclohexyl (meth)acrylate monomer used, the other monomer components used, and the crosslinking agent described below.

When the content of the cyclohexyl (meth)acrylate monomer described above is 30% by mass or more based on the total polymer component, the effect of the present invention can be exhibited, while less than 30% by mass of the content may impair the stability over time, which is not preferable.

Furthermore, in the polymer components constituting the colored resin fine particles for an aqueous ink, the content of the other monomer components except the cyclohexyl (meth)acrylate monomer is the remainder of the total amount of the cyclohexyl (meth)acrylate monomer used and the crosslinking agent described below.

Preferably, the content of the other monomer components is desired to be from 5 to 85% by mass based on the total polymer component in terms of further exerting the effect of the present invention and of dispersibility and reactivity.

In the present invention, it is necessary that the content of the basic dye or the oil-soluble dye is composed 15% by mass or more based on the total polymer component in terms of color developability, obtaining a sufficient drawn line concentration, stability, and the like, and it is desired that the content thereof is preferably from 15 to 50% by mass, and more preferably from 15 to 40% by mass.

When the content of the dye is 15% or more, satisfactory color developability and a sufficient drawn line intensity can be exhibited, while less than 15% by mass of the dye content may result in unsatisfactory color developability, and as a result, the effect of the present invention cannot be exhibited.

The polymerizable surfactant that can be used optionally is not particularly limited as long as the polymerizable surfactant is normally used in the emulsion polymerization described above. The polymerizable surfactant is, for example, an anionic or nonionic polymerizable surfactant, and includes at least one of ADECA REASOAP NE-10, NE-20, NE-30, NE-40, and SE-10N manufactured by ADECA Corporation, LATEMUL S-180, S-180A, and S-120A manufactured by Kao Corporation, ELEMINOL JS-20 manufactured by Sanyo Chemical Industry Ltd., and AQUALON KH-10 manufactured by DKS Co., Ltd.

It is desired that the amount of these polymerizable surfactants used is from 0 to 50% by mass, and preferably from 0.1 to 50% by mass, based on the total amount of the above-mentioned monomers.

Further, it is desired that the content of the crosslinking agent such as triallyl isocyanurate described above is from 0 to 50% by mass, and preferably from 0.1 to 25% by mass based on the total amount of the above-mentioned monomers.

In the present invention, the dispersion liquid of colored resin fine particles for an aqueous ink in which the colored resin fine particles having a resin solid content from 20 to 50% by mass are dispersed in water is obtained by the preferred embodiment described above, specifically, by dissolving at least the basic dye or the oil-soluble dye described above in the cyclohexyl (meth)acrylate monomer and emulsion-polymerizing the monomer, or by dissolving the basic dye or the oil-soluble dye in the polymer at least after polymerization of the mixed monomer containing the cyclohexyl (meth)acrylate monomer and the other monomer components to dye the polymer.

The dispersion liquid of the colored resin fine particles is a colorant having performances of more satisfactory color developability than before, excellent stability over time, and the like, and is useful as a colorant for an aqueous ink composition suitable for writing instruments such as felt-tip pens, marking pens, and ballpoint pens.

Also, in the present invention, an average particle size of the colored resin fine particles in the resulting dispersion liquid of the colored resin fine particles for an aqueous ink varies depending on the cyclohexyl (meth)acrylate monomer, the kind of the other monomers used, the contents, the polymerization conditions in the polymerization, and the like. It is desired that the colored resin fine particles preferably have an average particle size from 20 to 300 nm, more preferably from 40 to 150 nm, and further preferably from 60 to 110 nm.

When the average particle size is within the preferred range described above, a pen feed of a writing instrument such as a felt-tip pen, a marking pen, and a ballpoint pen is not clogged, and further, excellent storage stability is exhibited.

Note that the "average particle size" prescribed in the present invention refers to an average particle size in a histogram indicating a distribution of the scattered light intensity, and in the present invention (including Examples described below), the average particle size is a value of $D_{50}$ measured by means of a particle size distribution measuring equipment "FPAR1000 (manufactured by Otsuka Electronics Co., Ltd.)".

The aqueous ink composition for a writing instrument according to the present invention contains at least the dispersion liquid of the colored resin fine particles having the configuration described above, a water-soluble organic solvent, and water.

The water-soluble organic solvent that can be used includes, for example, at least one of alkylene glycols such as ethylene glycol, triethylene glycol, tetraethylene glycol, propylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol, and 1,2,3-hexanetriol; polyalkylene glycols such as polyethylene glycol and polypropylene glycol; glycerols such as glycerol, diglycerol, and triglycerol; simple alkyl ethers of glycols such as ethylene glycol monomethyl ether, ethylene glycol monoethyl ether, diethylene glycol monomethyl ether, diethylene glycol monoethyl ether, and diethylene glycol mono-n-butyl ether; N-methyl-2-pyrrolidone, and 1,3-dimethyl-2-imidalizinone.

In addition thereto, for example, water-soluble solvents including alcohols such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol, and benzyl alcohol; amides such as dimethylformamide and diethylacetamide; and ketones such as acetone can also be mixed.

The content of the water-soluble organic solvents varies depending on the kind of writing instruments such as felt-tip pens, marking pens, and ballpoint pens, and is from 1 to 40% by mass based on the total amount of the ink composition. The ink composition in which the content of the solvent is 10% by mass or less is particularly effective in terms of further improving a drying property of the drawn lines, and it is desired that the content is more preferably from 3 to 8% by mass.

The content of water (tap water, purified water, ion exchanged water, distilled water, pure water, and the like) is preferably from 30 to 90% by mass, and more preferably from 40 to 60% by mass, based on the total amount of the ink composition.

Also, the content of the colored resin particles varies depending on the kind of writing instruments, the outflow mechanism (pen feed, ballpoint pen), and the like. The solid content of the colored resin particles is preferably from 1 to 30% by mass based on the total amount of the aqueous ink composition for a writing instrument.

In the aqueous ink composition for a writing instrument according to the present invention, a preservative or a fungicide, a pH modifier, a defoamer, and the like can be appropriately selected and used, as necessary, as long as the effect of the present invention are not impaired.

The pH modifier includes, for example, at least one of ammonia, urea, monoethanolamine, diethanolamine, triethanolamine, aminomethylpropanol, alkali metal salts of carbonate and phosphate such as sodium tripolyphosphate and sodium carbonate, and hydroxides of alkali metals such as sodium hydroxide.

The preservative or the fungicide includes at least one of phenol, sodium omadine, sodium pentachlorophenol, 1,2-benzisothiazoline-3-one, 2,3,5,6-tetrachloro-4-(methylfonyl)pyridine, alkali metal salts of benzoate, sorbate, and dehydroacetate, and benzimidazole compounds.

The lubricant includes at least one of phosphate esters, polyalkylene glycol derivatives such as polyoxyethylene lauryl ether, alkali salts of fatty acid, nonionic surfactants, fluorine-based surfactants such as perfluoroalkyl phosphate esters, and polyether-modified silicones such as polyethylene glycol adduct of dimethylpolysiloxane.

The aqueous ink composition for a writing instrument according to the present invention may be prepared by appropriately combining at least the dispersion liquid of colored resin fine particles for an aqueous ink having the configuration described above, a water-soluble solvent, and other components depending on the application of ink for writing instruments (for ballpoint pens, marking pens, and others), and then mixing the components combined with stirring using a stirrer such as a homomixer, a homogenizer or a disperser, and if necessary, further filtering or centrifuging the mixture to remove coarse particles in the ink composition.

The writing instrument of the present invention is loaded with the aqueous ink composition for a writing instrument having the above-mentioned composition, and examples thereof include a ballpoint pen, a marking pen, and the like provided with a pen tip such as a ballpoint pen tip, a fiber tip, a felt tip, a plastic tip, a fiber feeder, and a porous feeder.

The ballpoint pen includes an instrument where the aqueous ink composition for a writing instrument having the above-mentioned composition is accommodated in an ink reservoir (refill) for a ballpoint pen, and where a material which is not compatible with the aqueous ink composition for a writing instrument having the above-mentioned composition accommodated in the ink reservoir and which has a small specific gravity with respect to the aqueous ink composition, for example, polybutene, silicone oil, and mineral oil is accommodated as an ink follower.

Note that the structures of the ballpoint pen and the marking pen are not particularly limited, and the ballpoint pen and the marking pen may be, for example, a free ink type pen provided with a collector structure (ink holding mechanism) using a barrel itself as an ink reservoir in which the barrel is filled with the aqueous ink composition for a writing instrument having the configuration described above.

The aqueous ink composition for a writing instrument thus constituted according to the present invention contains at least the dispersion liquid of colored resin fine particles for an aqueous ink having the configuration described above, the water-soluble solvent, and water. Therefore, the aqueous ink composition for a writing instrument that is suitable for writing instruments such as felt-tip pens, marking pens, and ballpoint pens having a sufficient drawn line intensity and excellent stability over time is obtained.

EXAMPLES

Next, the present invention will be described in further detail using Production Examples, Examples, and Comparative Examples, but the present invention are not limited to the following Examples and others.

Production Examples 1 to 12: Production of Dispersion Liquid of Colored Resin Fine Particles (Particles 1 to 12)

Dispersion liquids of colored resin fine particles were produced according to the following Production Examples 1 to 12. Note that the term "parts" below refers to parts by mass. A total amount (total parts) of the components in Production Examples 1 to 12 is 500 parts.

Production Example 1

A 2-liter flask equipped with a stirrer, a reflux condenser, a thermometer, a nitrogen gas-inlet, and a 1000 mL separating funnel for addition of a monomer was set in a hot water bath, and charged with 329.5 parts of distilled water, 5 parts of glycerin monomethacrylate (BLEMMER GLM, manufactured by NOF Corporation), 5 parts of sodium 2-sulfoethyl methacrylate (acrylic ester SEM-Na, manufactured by Mitsubishi Chemical Corporation), 20 parts of a polymerizable surfactant (ADEKA REASOAP SE-10N, manufactured by ADEKA Corporation, ether sulfate), and 0.5 parts of ammonium persulfate, and it was heated up to an internal temperature of 50° C. while nitrogen gas was introduced.

On the other hand, 40 parts of an oil-soluble dye (Savinyl Blue GLS, manufactured by Clariant K. K.) and 10 parts of a crosslinking agent (triallyl isocyanurate, "TRIC" manufactured by Nippon Kasei Chemical Company Limited) were mixed with a mixed monomer including 55 parts of cyclohexyl methacrylate monomer and 35 parts of n-butyl methacrylate as the other monomer to prepare a solution.

The liquid prepared above was added to the flask maintained at a temperature of approximately 50° C. from the separating funnel for 3 hours with stirring to carry out emulsion polymerization. Further, the solution was aged for 5 hours to terminate the polymerization, so that a dispersion liquid of colored resin fine particles for an aqueous ink (particle 1) was obtained.

The content of the cyclohexyl methacrylate monomer was 50.0% by mass based on the total polymer component constituting the colored resin fine particles, and the content of the oil-soluble dye was 36.4% by mass based on the total polymer component. The colored resin fine particles had an average particle diameter of 40 nm.

Production Example 2

An aqueous dispersion liquid of colored fine particles for an aqueous ink (particle 2) was obtained in the same manner as in Production Example 1 described above, except that in Production Example 1 described above, 340.5 parts of distilled water was used, the amount of cyclohexyl methacrylate monomer was 30 parts, the amount of n-butyl methacrylate was 45 parts, and 20 parts of an oil-soluble dye (VALIFAST PINK 2310 N, manufactured by Orient Chemical Industries Co., Ltd.), 12 parts of an oil-soluble dye (OIL PINK 314, manufactured by Orient Chemical Industries Co., Ltd.), 12 parts of an oil-soluble dye (VALIFAST RED 3312, manufactured by Orient Chemical Industries Co., Ltd.) were used as the dye.

The content of the cyclohexyl methacrylate monomer was 31.6% by mass based on the total polymer component constituting the colored resin fine particles, and the content of the oil-soluble dyes was 46.3% by mass based on the total polymer component. The colored resin fine particles had an average particle diameter of 82 nm.

Production Example 3

An aqueous dispersion liquid of colored fine particles for an aqueous ink (particle 3) was obtained in the same manner as in Production Example 1 described above, except that in Production Example 1 described above, 333.5 parts of distilled water was used, the amount of cyclohexyl methacrylate monomer was 60 parts, the amount of n-butyl methacrylate was 30 parts, and 25 parts of an oil-soluble dye (Spilon Yellow CGNH New, manufactured by Hodogaya Chemical Co., Ltd.) and 11 parts of an oil-soluble dye (VALIFAST YELLOW 1109, manufactured by Orient Chemical Industries Co., Ltd.) were used as the dye.

The content of the cyclohexyl methacrylate monomer was 54.5% by mass based on the total polymer component constituting the colored resin fine particles, and the content of the oil-soluble dyes was 32.7% by mass based on the total polymer component. The colored resin fine particles had an average particle diameter of 65 nm.

Production Example 4

An aqueous dispersion liquid of colored fine particles for an aqueous ink (particle 4) was obtained in the same manner as in Production Example 1 described above, except that in Production Example 1 described above, 309.5 parts of distilled water was used, the amount of cyclohexyl methacrylate monomer was 60 parts, the amount of n-butyl methacrylate was 35 parts, and 10 parts of an oil-soluble dye (VALIFAST RED 3312, manufactured by Orient Chemical Industries Co., Ltd.), 25 parts of an oil-soluble dye (VALIFAST BLACK 1821, manufactured by Orient Chemical Industries Co., Ltd.), and 10 parts of an oil-soluble dye (VALIFAST YELLOW 129, manufactured by Orient Chemical Industries Co., Ltd.) were used as the dye.

The content of the cyclohexyl methacrylate monomer was 52.2% by mass based on the total polymer component constituting the colored resin fine particles, and the content of the oil-soluble dye was 39.1% by mass based on the total polymer component. The colored resin fine particles had an average particle diameter of 132 nm.

Production Example 5

An aqueous dispersion liquid of colored fine particles for an aqueous ink (particle 5) was obtained in the same manner as in Production Example 1 described above, except that in Production Example 1 described above, 55 parts of cyclohexyl acrylate monomer was used instead of 55 parts of cyclohexyl methacrylate monomer.

The content of the cyclohexyl acrylate monomer was 50.0% by mass based on the total polymer component constituting the colored resin fine particles, and the content of the oil-soluble dye was 36.4% by mass based on the total polymer component. The colored resin fine particles had an average particle diameter of 51 nm.

Production Example 6

An aqueous dispersion liquid of colored fine particles for an aqueous ink (particle 6) was obtained in the same manner as in Production Example 2 described above, except that in Production Example 2 described above, 45 parts of methyl methacrylate was used instead of 45 parts of n-butyl methacrylate.

The content of the cyclohexyl methacrylate monomer was 31.6% by mass based on the total polymer component constituting the colored resin fine particles, and the content of the oil-soluble dye was 46.3% by mass based on the total polymer component. The colored resin fine particles had an average particle diameter of 91 nm.

Production Example 7

An aqueous dispersion liquid of colored fine particles for an aqueous ink (particle 7) was obtained in the same manner as in Production Example 3 described above, except that in Production Example 3 described above, 30 parts of styrene was used instead of 30 parts of n-butyl methacrylate.

The content of the cyclohexyl methacrylate monomer was 54.5% by mass based on the total polymer component constituting the colored resin fine particles, and the content of the oil-soluble dye was 32.7% by mass based on the total polymer component. The colored resin fine particles had an average particle diameter of 70 nm.

Production Example 8

An aqueous dispersion liquid of colored fine particles for an aqueous ink (particles 8) was obtained in the same manner as in Production Example 4 described above, except that in Production Example 4 described above, 289.5 parts of distilled water was used, the amount of cyclohexyl methacrylate monomer was 90 parts, and the amount of n-butyl methacrylate was 25 parts.

The content of the cyclohexyl methacrylate monomer was 66.7% by mass based on the total polymer component constituting the colored resin fine particles, and the content of the oil-soluble dye was 33.3% by mass based on the total polymer component. The colored resin fine particles had an average particle diameter of 110 nm.

Production Example 9

An aqueous dispersion liquid of colored fine particles for an aqueous ink (particle 9) was obtained in the same manner as in Production Example 1 described above, except that in Production Example 1 described above, 339.5 parts of distilled water was used and the amount of the crosslinking agent was 0 (zero) parts (not used).

The content of the cyclohexyl methacrylate monomer was 55.0% by mass based on the total polymer component constituting the colored resin fine particles, and the content of the oil-soluble dye was 40.0% by mass based on the total polymer component. The colored resin fine particles had an average particle diameter of 55 nm.

Production Example 10

Polymerization was carried out in the same manner as in Production Example 2 described above, except that in Production Example 2 described above, cyclohexyl methacrylate monomer was not used (content: zero) and 75 parts of n-butyl methacrylate was used, but in the production, the amount of dye used was large and cyclohexyl methacrylate monomer was not used, thereby failing to achieve good polymerization.

The content of the oil-soluble dye was 46.3% by mass based on the total polymer component.

Production Example 11

Polymerization was carried out in the same manner as in Production Example 3 described above, except that in Production Example 3 described above, cyclohexyl methacrylate monomer was not used (content: zero), and 90 parts of n-butyl methacrylate was used, but in the production, the amount of dye used was large and cyclohexyl methacrylate monomer was not used, thereby failing to achieve good polymerization.

The content of the oil-soluble dye was 32.7% by mass based on the total polymer component.

Production Example 12

An aqueous dispersion liquid of colored fine particles for an aqueous ink (particle 12) was obtained in the same manner as in the Production Example 4, except that in Production Example 4 described above, the amount of cyclohexyl methacrylate monomer was 30 parts and the amount of n-butyl methacrylate was 65 parts.

The content of the cyclohexyl methacrylate monomer was 26.1% by mass based on the total polymer component constituting the colored resin fine particles, and the content of the oil-soluble dye was 39.1% by mass based on the total polymer component. The colored resin fine particles had an average particle diameter of 85 nm.

The dispersion liquids of colored resin fine particles for an aqueous ink obtained in Production Examples 1 to 9, and 12 described above had a resin solid content from 20 to 40% by mass.

Examples 1 to 9 and Comparative Examples 1 to 3:
Preparation of Aqueous Ink Compositions for a Writing Instrument The respective dispersion liquids of colored resin fine particles (particles 1 to 9, and 12) produced in Production Examples 1 to 9, and 12 were used to prepare the respective aqueous ink compositions for a writing instrument by an ordinary method according to the blend composition (total amount: 100% by mass) described below.
Ink Composition (Total Amount: 100% by Mass)
    Respective dispersion liquids of colored resin fine particles for an aqueous ink 50% by mass
    pH modifier (triethanolamine) 1% by mass
    Water-soluble organic solvent (ethylene glycol) 5% by mass
    Ion exchanged water 44% by mass The resulting aqueous ink compositions for a writing instrument (total amount: 100% by mass) were evaluated for stability over time according to the following evaluation method.

The respective evaluation results of Examples 1 to 9 and Comparative Examples 1 to 3 are shown in the following Table 1.
(Evaluation Method of Stability Over Time)

Glass vials filled with the respective ink compositions prepared in Examples 1 to 9 and Comparative Example 3 described above were covered with caps, and stored in an environment of 50° C. to evaluate a period in which aggregation and sedimentation were not observed in the ink in the vial after a certain period of time passed as "period in which stability is maintained" according to the following evaluation criteria.

Note that since good polymerization was not achieved in Comparative Examples 1 and 2 (Production Examples 10 and 11), the evaluation was impossible (indicated by "–" in the evaluation column).

Evaluation Criteria:
A: 6 months or more
B: 3 months or more and less than 6 months
C: less than 3 months

TABLE 1

|  | Example | | | | | | | | | Comparative Example | | |
|---|---|---|---|---|---|---|---|---|---|---|---|---|
|  | 1 | 2 | 3 | 4 | 5 | 6 | 7 | 8 | 9 | 1 | 2 | 3 |
| Production Example No. | 1 | 2 | 3 | 4 | 5 | 6 | 7 | 8 | 9 | 10 | 11 | 12 |
| Evaluation | A | A | A | A | A | A | A | B | B | — | — | C |

To discuss the results shown in Table 1 above, it has been found that the stability over time in Examples 1 to 9 falling in the scope of the present invention is better than that in Comparative Example 3 out of the scope of the present invention. Further, to inspect Examples, when Examples 1 to 7 and Examples 8 and 9 are compared and discussed, the content of cyclohexyl methacrylate monomer in Example 8 is more than the content of cyclohexyl methacrylate monomer in Examples 1 to 7, and in Example 9, the crosslinking agent is not contained, so that in these Examples, the stability over time tends to be evaluated as slightly poor.

Furthermore, using the aqueous ink compositions for a writing instrument after the evaluation of the stability over time in Examples 1 to 9 (after 7 months in Examples 1 to 7, and after 5 months in Examples 8 and 9), the ballpoint pen and marking pen having the following configuration were prepared and then used to write on a writing paper, so that the writing performance of the writing instruments was evaluated.

(Preparation of Writing Instrument: Ballpoint Pen)

Specifically, using a barrel of a ballpoint pen (trade name: Signo UM-100, manufactured by Mitsubishi Pencil Co., Ltd.), a refill including an ink reservoir tube made of polypropylene having an inner diameter of 4.0 mm and a length of 113 mm, a stainless steel tip (cemented carbide ball, ball diameter: 0.7 mm) and a joint connecting the storage tube and the tip was filled with the aqueous ink compositions described above, and an ink follower composed mainly of a mineral oil was inserted at the rear end of the ink, thus preparing an aqueous ballpoint pen.

(Preparation of Writing Instrument: Marking Pen)

Each of the aqueous ink compositions described above was inserted in a marking pen (trade name: Propus Window PUS-102T, manufactured by Mitsubishi Pencil Co., Ltd., pen tip, thick: PE resin sintered feed, thin: PET fiber feed) to prepare a marking pen.

It has been confirmed that the ballpoint pen and the marking pen prepared above do not cause starving and feathering, and have a sufficient drawn line intensity to give a sharp drawn line.

INDUSTRIAL APPLICABILITY

A dispersion liquid of colored resin fine particles for an aqueous ink suitable for writing instruments such as felt-tip pens, marking pens, and ballpoint pens, an aqueous ink composition for a writing instrument prepared by using the dispersion liquid, and a writing instrument are obtained.

The invention claimed is:

1. A dispersion liquid of colored resin fine particles for an aqueous ink, comprising:
   colored resin fine particles dispersed in water, wherein the colored resin fine particles are composed of at least a polymer formed from a cyclohexyl (meth)acrylate monomer, a hydrophobic vinyl monomer other than the cyclohexyl (meth)acrylate monomer, and an aqueous (meth)acrylate ester monomer, and
   a basic dye or an oil-soluble dye, wherein
   a content of the cyclohexyl (meth)acrylate monomer is 30% by mass or more based on a total polymer component constituting the colored resin fine particles, and
   a content of the basic dye or the oil-soluble dye is 15% by mass or more based on the total polymer component.

2. The dispersion liquid of colored resin fine particles for an aqueous ink according to claim 1, wherein the content of the cyclohexyl (meth)acrylate monomer is from 30% by mass to 95% by mass based on the total polymer component constituting the colored resin fine particles.

3. The dispersion liquid of colored resin fine particles for an aqueous ink according to claim 1, wherein the colored resin fine particles have an average particle size from 20 to 300 nm.

4. An aqueous ink composition for a writing instrument, comprising the dispersion liquid of colored resin fine particles for an aqueous ink described in claim 1, a water-soluble organic solvent, and water.

5. A writing instrument being loaded with the aqueous ink composition for a writing instrument described in claim 4.

6. The dispersion liquid of colored resin fine particles for an aqueous ink according to claim 2, wherein the colored resin fine particles have an average particle size from 20 to 300 nm.

7. An aqueous ink composition for a writing instrument, comprising the dispersion liquid of colored resin fine particles for an aqueous ink described in claim 2, a water-soluble organic solvent, and water.

8. An aqueous ink composition for a writing instrument, comprising the dispersion liquid of colored resin fine particles for an aqueous ink described in claim 3, a water-soluble organic solvent, and water.

9. A writing instrument being loaded with the aqueous ink composition for a writing instrument described in claim 7.

10. A writing instrument being loaded with the aqueous ink composition for a writing instrument described in claim 8.

11. The dispersion liquid of colored resin fine particles for an aqueous ink according to claim 1, wherein
   the hydrophobic vinyl monomer other than the cyclohexyl (meth)acrylate monomer is at least one selected from the group consisting of methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, palmityl (meth)acrylate, stearyl (meth)acrylate, behenyl (meth)acrylate, styrene, and methyl styrene.

12. The dispersion liquid of colored resin fine particles for an aqueous ink according to claim 1, wherein
   the aqueous monomer is at least one selected from the group consisting of glycerin monomethacrylate, sodium 2-sulfoethyl methacrylate, polyethylene glycol monomethacrylate, polypropylene glycol monomethacrylate, polyethylene glycol-polypropylene glycol monomethacrylate, polyethylene glycol-tetramethylene glycol-monomethacrylate, and propylene glycol-polybutylene glycol-monomethacrylate.

13. The dispersion liquid of colored resin fine particles for an aqueous ink according to claim 1, further comprising a crosslinking agent in a content of from 0.1 to 25% by mass based on a total amount of the monomers.

\* \* \* \* \*